US008645598B2

(12) United States Patent
Van Antwerpen et al.

(10) Patent No.: US 8,645,598 B2
(45) Date of Patent: *Feb. 4, 2014

(54) DOWNSTREAM INTERFACE PORTS FOR CONNECTING TO USB CAPABLE DEVICES

(75) Inventors: Hans Van Antwerpen, Mountain View, CA (US); Herve Letourneur, Mountain View, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,161

(22) Filed: Sep. 14, 2012

(65) Prior Publication Data

US 2013/0145056 A1    Jun. 6, 2013

Related U.S. Application Data

(63) Continuation of application No. 13/076,733, filed on Mar. 31, 2011, now Pat. No. 8,364,870.

(60) Provisional application No. 61/388,061, filed on Sep. 30, 2010.

(51) Int. Cl.
*G06F 13/12* (2006.01)
*G06F 13/00* (2006.01)

(52) U.S. Cl.
USPC .................. 710/63; 710/62; 710/72; 710/100

(58) Field of Classification Search
None
See application file for complete search history.

(56) References Cited

U.S. PATENT DOCUMENTS

| 4,242,604 A | 12/1980 | Smith |
| 4,272,760 A | 6/1981 | Prazak et al. |
| 4,344,067 A | 8/1982 | Lee |
| 4,571,507 A | 2/1986 | Collings |
| 4,684,824 A | 8/1987 | Moberg |
| 4,689,581 A | 8/1987 | Talbot |
| 4,689,740 A | 8/1987 | Moelands et al. |
| 4,736,123 A | 4/1988 | Miyazawa et al. |
| 4,797,580 A | 1/1989 | Sunter |
| 4,855,683 A | 8/1989 | Troudet et al. |
| 4,882,549 A | 11/1989 | Galani et al. |
| 4,980,653 A | 12/1990 | Shepherd |
| 4,988,983 A | 1/1991 | Wehrer |
| 5,019,729 A | 5/1991 | Kimura et al. |
| 5,036,300 A | 7/1991 | Nicolai |
| 5,073,757 A | 12/1991 | George |
| 5,095,280 A | 3/1992 | Wunner et al. |
| 5,111,081 A | 5/1992 | Atallah |
| 5,142,247 A | 8/1992 | Lada, Jr. et al. |
| 5,144,254 A | 9/1992 | Wilke |
| 5,150,079 A | 9/1992 | Williams et al. |

(Continued)

OTHER PUBLICATIONS

International Search Report for International Application No. PCT/US11/54234 dated Mar. 1, 2012; 2 pages.

(Continued)

*Primary Examiner* — Idriss N Alrobaye
*Assistant Examiner* — Richard B Franklin

(57) ABSTRACT

At least one downstream interface may be configured to be simultaneously connected to both a USB 3.0 compliant device and a USB 2.0 compliant device. The interface may be used for communicating with a USB 3.0 compliant device via a downstream port and simultaneously communicating with a USB 2.0 compliant device via the downstream port.

22 Claims, 8 Drawing Sheets

(56) References Cited

U.S. PATENT DOCUMENTS

| | | | |
|---|---|---|---|
| 5,268,599 A | 12/1993 | Matsui |
| 5,289,138 A | 2/1994 | Wang |
| 5,321,319 A | 6/1994 | Mahmood |
| 5,349,544 A | 9/1994 | Wright et al. |
| 5,355,033 A | 10/1994 | Jang |
| 5,381,116 A | 1/1995 | Nuckolls et al. |
| 5,408,191 A | 4/1995 | Han et al. |
| 5,420,543 A | 5/1995 | Lundberg et al. |
| 5,432,665 A | 7/1995 | Hopkins |
| 5,446,867 A | 8/1995 | Young et al. |
| 5,451,912 A | 9/1995 | Torode |
| 5,473,285 A | 12/1995 | Nuckolls et al. |
| 5,481,179 A | 1/1996 | Keeth |
| 5,495,205 A | 2/1996 | Parker et al. |
| 5,506,875 A | 4/1996 | Nuckolls et al. |
| 5,511,100 A | 4/1996 | Lundberg et al. |
| 5,525,933 A | 6/1996 | Matsuki et al. |
| 5,554,942 A | 9/1996 | Herr et al. |
| 5,563,553 A | 10/1996 | Jackson |
| 5,565,819 A | 10/1996 | Cooper |
| 5,583,501 A | 12/1996 | Henrion et al. |
| 5,589,783 A | 12/1996 | McClure |
| 5,608,770 A | 3/1997 | Noguchi et al. |
| 5,610,550 A | 3/1997 | Furutani |
| 5,610,955 A | 3/1997 | Bland |
| 5,614,869 A | 3/1997 | Bland |
| 5,644,254 A | 7/1997 | Boudry |
| 5,666,118 A | 9/1997 | Gersbach |
| 5,668,506 A | 9/1997 | Watanabe et al. |
| 5,673,004 A | 9/1997 | Park |
| 5,686,863 A | 11/1997 | Whiteside |
| 5,703,537 A | 12/1997 | Bland et al. |
| 5,703,540 A | 12/1997 | Gazda et al. |
| 5,729,165 A | 3/1998 | Lou et al. |
| 5,805,909 A | 9/1998 | Diewald |
| 5,825,317 A | 10/1998 | Anderson et al. |
| 5,841,424 A | 11/1998 | Kikinis et al. |
| 5,845,151 A | 12/1998 | Story et al. |
| 5,867,015 A | 2/1999 | Corsi et al. |
| 5,877,656 A | 3/1999 | Mann et al. |
| 5,949,408 A | 9/1999 | Kang et al. |
| 6,040,707 A | 3/2000 | Young et al. |
| 6,141,007 A | 10/2000 | Lebling et al. |
| 6,157,266 A | 12/2000 | Tsai et al. |
| 6,199,969 B1 | 3/2001 | Haflinger et al. |
| 6,211,739 B1 | 4/2001 | Snyder et al. |
| 6,219,736 B1 | 4/2001 | Klingman |
| 6,266,715 B1 | 7/2001 | Loyer et al. |
| 6,286,060 B1 | 9/2001 | DiGiorgio et al. |
| 6,297,705 B1 | 10/2001 | Williams et al. |
| 6,357,011 B2 | 3/2002 | Gilbert |
| 6,407,641 B1 | 6/2002 | Williams et al. |
| 6,433,645 B1 | 8/2002 | Mann et al. |
| 6,435,904 B1 | 8/2002 | Herbst et al. |
| 6,515,551 B1 | 2/2003 | Mar et al. |
| 6,525,616 B1 | 2/2003 | Williams et al. |
| 6,646,514 B2 | 11/2003 | Sutliff et al. |
| 6,708,233 B1 | 3/2004 | Fuller et al. |
| 6,708,247 B1 | 3/2004 | Barret et al. |
| 6,742,076 B2 | 5/2004 | Wang et al. |
| 6,753,739 B1 | 6/2004 | Mar et al. |
| 6,807,109 B2 | 10/2004 | Tomishima |
| 6,812,678 B1 | 11/2004 | Brohlin |
| 6,934,788 B2 | 8/2005 | Laity et al. |
| 6,946,920 B1 | 9/2005 | Williams et al. |
| 6,959,355 B2 | 10/2005 | Szabelski |
| 6,960,953 B2 | 11/2005 | Ichihara |
| 6,961,665 B2 | 11/2005 | Slezak |
| 6,989,659 B2 | 1/2006 | Menegoli et al. |
| 7,170,257 B2 | 1/2007 | Oh |
| 7,185,126 B2 | 2/2007 | Szabelski |
| 7,212,183 B2 | 5/2007 | Tobita |
| 7,269,669 B2 | 9/2007 | Liu et al. |
| 7,276,977 B2 | 10/2007 | Self |
| 7,290,072 B2 | 10/2007 | Quraishi et al. |
| 7,348,861 B1 | 3/2008 | Wu et al. |
| 7,375,593 B2 | 5/2008 | Self |
| 7,391,204 B2 | 6/2008 | Bicking |
| 7,397,226 B1 | 7/2008 | Mannama et al. |
| 7,439,777 B2 | 10/2008 | Wood |
| 7,446,747 B2 | 11/2008 | Youngblood et al. |
| 7,563,140 B1 | 7/2009 | Wan et al. |
| 7,574,532 B2 | 8/2009 | Wang et al. |
| 7,600,156 B2 | 10/2009 | Thornley et al. |
| 7,612,527 B2 | 11/2009 | Hoffman et al. |
| 7,631,111 B2 | 12/2009 | Monks et al. |
| 8,085,020 B1 | 12/2011 | Bennett |
| 8,164,365 B2 | 4/2012 | Wright et al. |
| 2004/0217799 A1 | 11/2004 | Ichihara |
| 2004/0250231 A1 | 12/2004 | Killian et al. |
| 2005/0057482 A1 | 3/2005 | Youngblood et al. |
| 2006/0179144 A1 | 8/2006 | Nagase |
| 2008/0258740 A1 | 10/2008 | Wright et al. |
| 2008/0259017 A1 | 10/2008 | Wright et al. |
| 2008/0259065 A1 | 10/2008 | Wright et al. |
| 2008/0259070 A1 | 10/2008 | Snyder et al. |
| 2008/0263243 A1 | 10/2008 | Wright et al. |
| 2008/0263260 A1 | 10/2008 | Snyder et al. |
| 2009/0054129 A1 | 2/2009 | Yoshimura et al. |
| 2009/0177809 A1 | 7/2009 | Bhesania et al. |
| 2009/0286421 A1 | 11/2009 | Rugg et al. |
| 2010/0169511 A1 | 7/2010 | Dunstan et al. |
| 2011/0016267 A1 | 1/2011 | Lee et al. |
| 2011/0208892 A1* | 8/2011 | Meyers .................. 710/313 |
| 2011/0248692 A1 | 10/2011 | Shehu et al. |
| 2012/0066418 A1 | 3/2012 | Foster |
| 2012/0066537 A1* | 3/2012 | Foster .................. 713/400 |
| 2013/0059453 A1* | 3/2013 | Tseng .................. 439/78 |

OTHER PUBLICATIONS

Keaton Drake et al., "USB3.0 and USBW," downloaded from http://www.cs.ucf.edu/courses/eeI3531/spr2009/Group%208-3.pdf on Jun. 28, 2011; 15 pages.

Michael Juliano, "Logitech lets multiple wireless devices connect to one USB transceiver with 'Unifying' technology," published on Aug. 4, 2009, downloaded from http://news.cnet.com/8301-17938_105-10302008-1.html on Jun. 28, 2011; 5 pages.

USPTO Non Final Rejection for U.S. Appl. No. 13/076,733 dated Mar. 22, 2012; 11 pages.

USPTO Notice of Allowance for U.S. Appl. No. 13/076,733 dated Jul. 30, 2012; 10 pages.

Written Opinion for International Application No. PCT/US11/54234 dated Mar. 1, 2012; 4 pages.

* cited by examiner

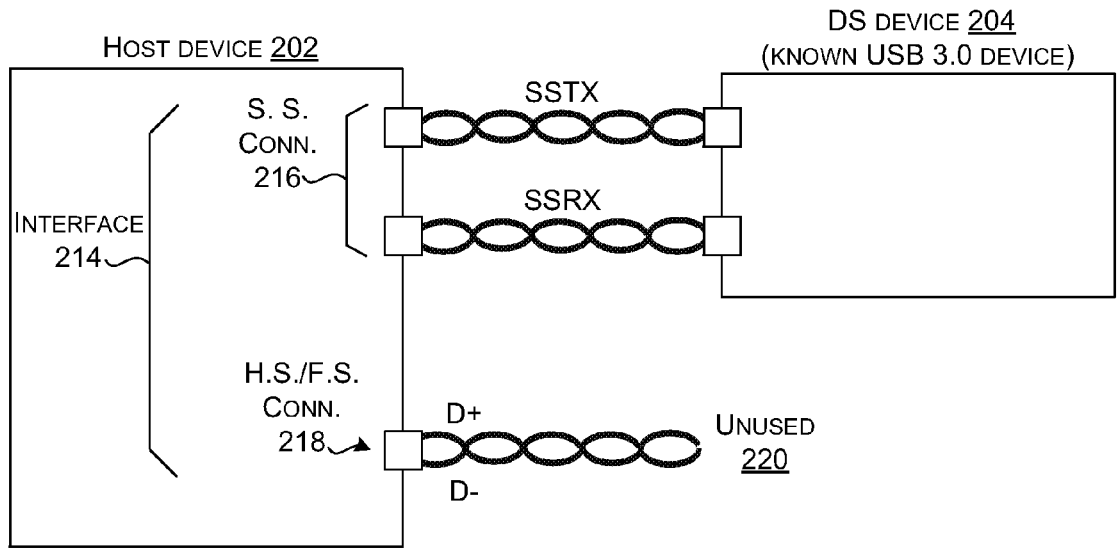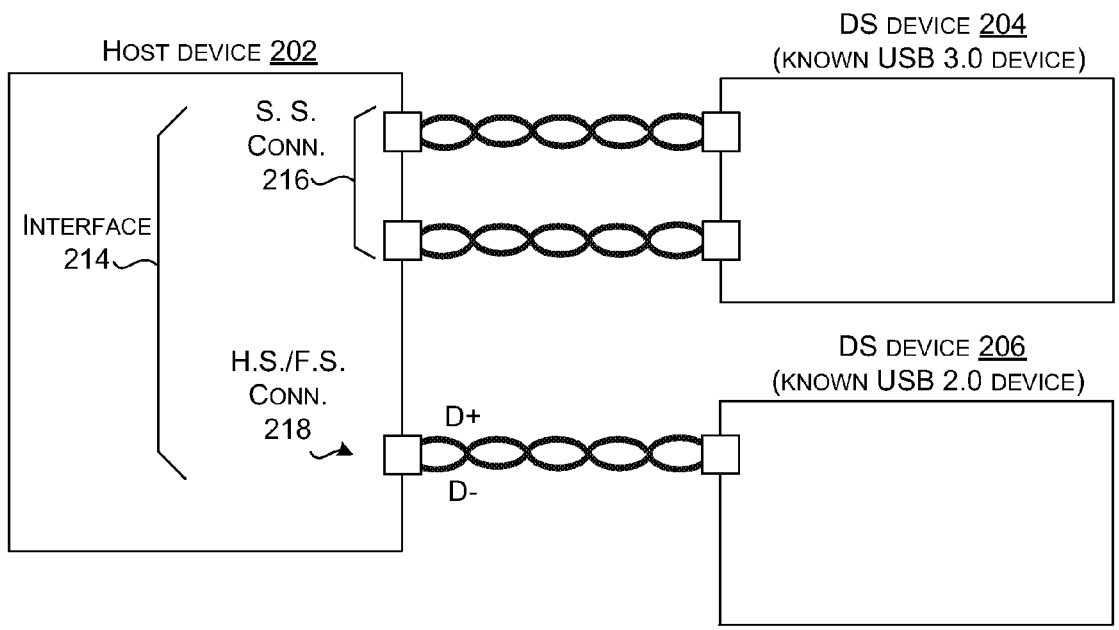
FIG. 2

DOWNSTREAM INTERFACE PORTS FOR CONNECTING TO USB CAPABLE DEVICES

RELATED APPLICATIONS

This application is a continuation of U.S. application Ser. No. 13/076,733, filed Mar. 31, 2011, now issued as U.S. Pat. No. 8,364,870, which claims priority to U.S. Provisional Patent Application No. 61/338,061, filed Sep. 30, 2010, both of which are incorporated by reference herein in their entirety.

BACKGROUND

Universal Serial Bus (USB) technologies have been extremely successful and their application is nearly ubiquitous. The advent of USB 3.0 compliant standards provide enhanced performance through greater data transfer rates. USB 3.0 standards employ SSTX and SSTR—signals (hereinafter, "SuperSpeed" signals) to achieve the greater data transfer rates. In order to maintain the universal nature, backwards compatibility is maintained by also including USB 2.0 compliant D+ and D− signals (hereinafter, "Hi-Speed" signals) so that older USB devices that are not configured to handle the SuperSpeed signals may still communicate using USB 2.0 signals (e.g., Hi-Speed, full-speed and/or low-speed) signals.

BRIEF DESCRIPTION OF THE DRAWINGS

The accompanying drawings illustrate implementations of the concepts conveyed in the present application. Features of the illustrated implementations may be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIG. 2 shows an embodiment of a system 200 that effectively utilizes USB resources.

FIGS. 2, 2A, 2B, and 3-7 are USB resource utilization techniques that may be employed in accordance with various embodiments of the invention.

DETAILED DESCRIPTION

This patent relates to Universal Serial Bus (USB) technologies and specifically to utilizing resources available with USB technologies. USB 3.0 is a relatively new standard that offers better performance than existing USB 2.0 technologies. USB 3.0 further maintains backwards compatibility for USB 2.0 devices. Briefly, USB 3.0 compliant interfaces include a first set of SuperSpeed conductors (SSTX and SSRX signals) and a second set of Hi-Speed USB 2.0 conductors (D+ and D− signals).

In many usage scenarios, a USB interface terminates in a USB port that includes a female receptacle. The female receptacle may allow a user to plug a male plug of a downstream device, such as flash memory dongle device, camera, mouse, etc., into the USB port. If the downstream device is USB 3.0 compliant then data communications with the downstream device utilize the first set of SuperSpeed conductors. Otherwise, the second set of Hi-Speed USB 2.0 conductors may be utilized. Such a system offers backwards compatibility so that any unknown USB device that is plugged into the port functions properly.

However, other applications do not have this unknown factor. For instance, USB technologies may be utilized to fixedly connect known components together. In such a case, it is known in advance whether the downstream device is USB 3.0 compliant or USB 2.0 compliant. In such a case, the redundant first and second sets of SuperSpeed conductors and USB 2.0 compliant conductors do not offer enhanced flexibility, but instead simply lead to increased cost and/or decreased performance since one of the connectors is not being used.

As used herein, the term "USB 3.0" or "USB 3.0 Compliant" are used to mean a device (which may include one or more compliant components) that supports SuperSpeed signaling as defined in the USB 3.0 specification by the USB-IF (Implementers Forum), Inc. Similarly, the term "Hi-Speed conductors" is used to refer to the D+/D− lines that may be used for low, full or Hi-Speed signaling as defined in the USB 2.0 specification by the USB-IF. Additionally, it is possible for a USB 3.0 compliant device to support all or some of the capabilities defined by the USB 2.0 specification, and a USB 2.0 compliant device to support some of the capabilities defined by the USB 3.0 specification. These two specifications are used by way of example only and are not intended to be limiting with respect to the spirit of the method and apparatus embodiments described herein or their equivalence.

Figure 1:
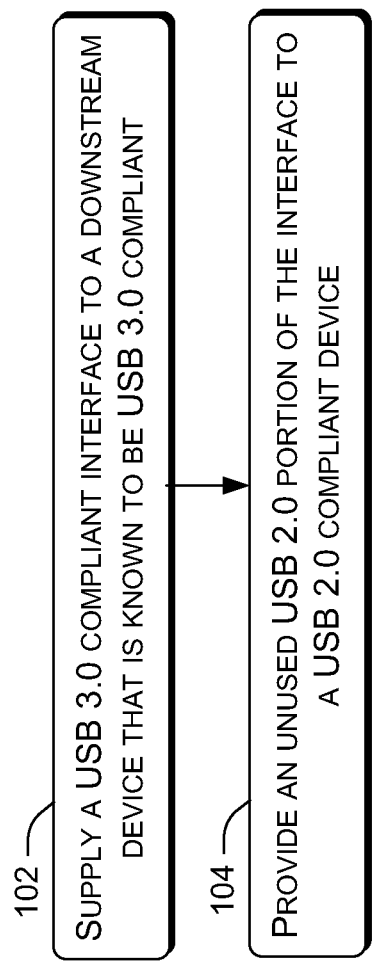
FIG. 1 is a flowchart of a USB resources utilization method that may be accomplished in accordance with various embodiments.

FIG. 1 is an embodiment of method 100 that may be employed to offer the user increased performance and/or decreased cost for a given system configuration. At 102, the method supplies a USB 3.0 compliant interface to a downstream device that is known to be USB 3.0 compliant and therefore only uses the SuperSpeed portion of the interface. At 104, the method provides an unused USB 2.0 compliant portion of the USB 3.0 interface to a USB 2.0 compliant device. Thus, a single USB 3.0 interface may be utilized to communicate with two different downstream devices. In one case, the USB 3.0 compliant interface may include a downstream port that includes SuperSpeed conductors and Hi-Speed conductors. The SuperSpeed conductors may be connected to a USB 3.0 compliant device and the Hi-Speed conductors may be connected to a USB 2.0 compliant device. Thus, a single port may service two devices. Accordingly, the end user or consumer may receive better and/or more functionality for a given set of system resources than was previously possible.

In some embodiments, method 100 and/or other methods for accomplishing the present concepts may be stored on computer-readable storage media as computer-readable instructions. A processor, such as a controller, may execute the computer-readable instructions to perform the method.

FIG. 2 shows an embodiment of a system 200 that effectively utilizes USB resources. System 200 includes a host device 202, and two downstream devices 204 and 206. In this case, downstream device 204 is known to be a USB 3.0 compliant (or at least USB 3.0 capable) device and downstream device 206 is known to be a USB 2.0 compliant device. For purposes of explanation, system 200 is explained relative to a first scenario 210 and a second scenario 212 that will be discussed in more detail below.

Host 202 may supply an interface 214 that includes a first set of conductors 216 and a second set of conductors 218. The interface 214 may be USB 3.0 compliant. In this case, the first set of conductors 216 are SuperSpeed (USB 3.0) compliant SSTX and SSTR lines. Similarly, the second set of conductors 218 may be Hi-Speed (USB 2.0) compliant D+ and D− lines.

In the embodiment depicted in scenario 210, downstream device 204 is a known USB 3.0 compliant device. Accordingly, the first set of conductors 216 are utilized for communications between host device 202 and downstream device 204, while the second set of conductors 218 remain unutilized as indicated at 220. Thus, from a resource usage perspective, interface 214 is under-utilized as a resource in scenario 210. A contrasting example is described below relative to scenario 212.

In the embodiment depicted in scenario 212, downstream device 204 is connected to host device 202 in the same manner as scenario 210. However, second set of conductors 218 is connected to downstream device 206 to increase resource utilization. Accordingly, interface 214 which in scenario 210 was connected with a single downstream device may now be utilized to connect to two downstream devices. Thus, for a given cost of host device 202, the end user may be provided with more functionality in scenario 212 than in scenario 210. Among other cases, scenario 212 may be realized in instances where it is known that downstream device 204 is a USB 3.0 compliant device and that downstream device 204 is to be connected to interface 214 in a generally permanent manner. As used herein, a generally permanent manner means that the end user does not expect to readily and frequently disconnect downstream device 204 and connect some other downstream device.

Figure 2A:
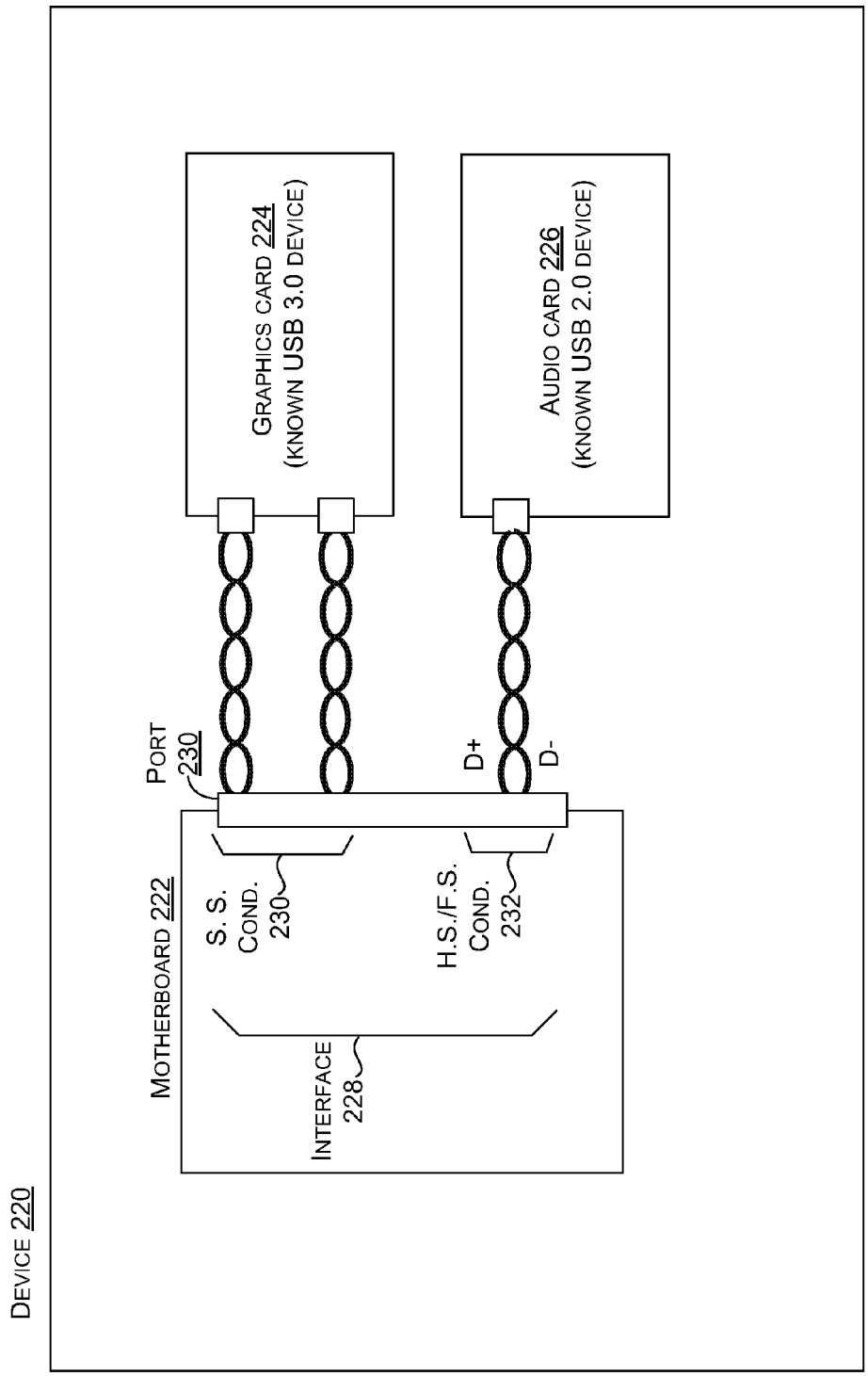
FIG. 2A shows an embodiment of an implementation of the scenario 212 in a device 220.

FIG. 2A shows an embodiment of an implementation of the scenario 212 in a device 220. In this case, device 220 includes a motherboard 222 coupled to a graphics card 224 that is a known USB 3.0 capable device and an audio card 226 that is a known USB 2.0 device via a single USB interface 228 that includes a port 230. The USB interface provides SuperSpeed connectors 232 to the graphics card 224 and Hi-Speed connectors 234 to audio card 226.

Figure 2B:
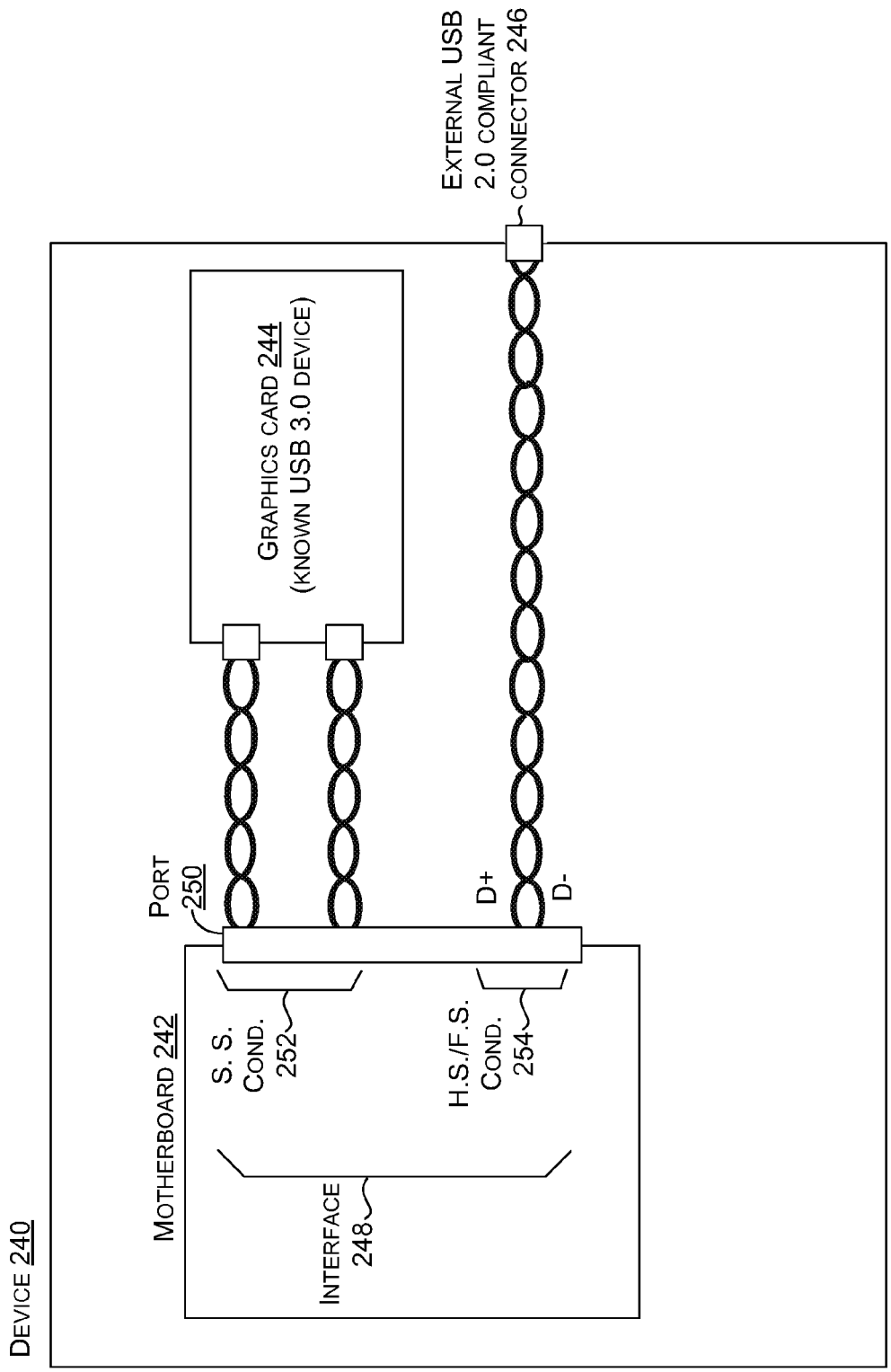
FIG. 2B shows another example of an implementation of scenario 212 in a device 240.

FIG. 2B shows another example of an implementation of scenario 212 in a device 240. In this case, device 240 includes a motherboard 242 coupled to a graphics card 244 that is a known USB 3.0 device. The motherboard is also coupled to an external USB 2.0 compliant connector 246. The external USB 2.0 compliant connector 246 may be manifest as a female USB receptacle that may receive any USB 2.0 compliant device, such as a memory stick, card reader, keyboard, mouse, etc. The motherboard is connected to the graphics card and the external USB 2.0 compliant connector 246 via a single USB interface 248 that includes a port 250. The USB interface 248 provides SuperSpeed connectors 252 to the graphics card 244 and Hi-Speed connectors 254 to external USB 2.0 compliant connector 246.

Figure 3:
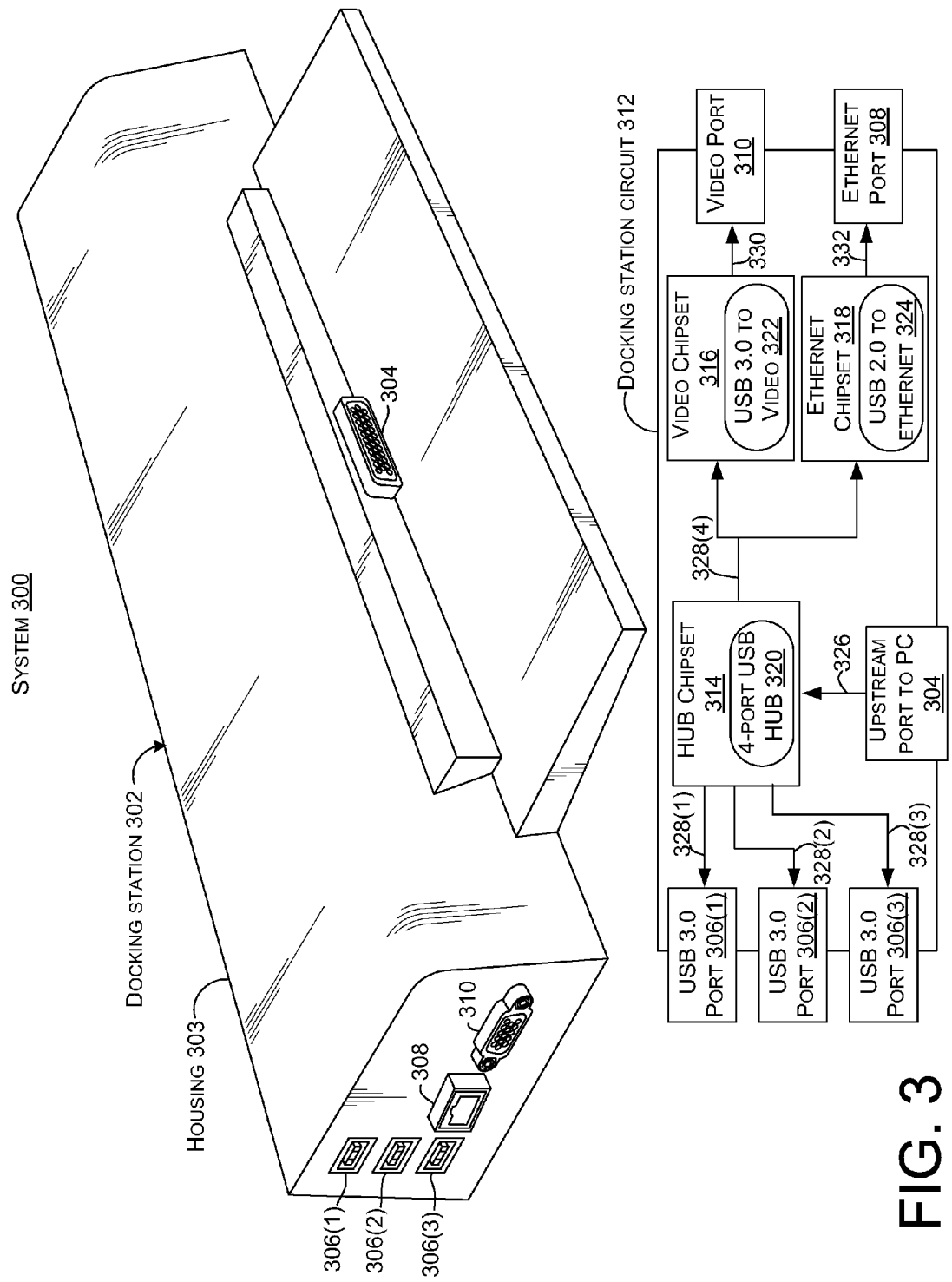

FIG. 3 shows another embodiment of a system 300 that may effectively utilize USB resources. System 300 includes a device implemented as a docking station 302. The principles described relative to docking station 302 may be utilized with other devices that may employ USB technologies. In this example, docking station 302 includes six external ports positioned relative to a housing 303. One of the external ports is an upstream port 304 that goes to a PC. The remaining five ports are downstream ports in the form of three USB 3.0 compliant USB ports 306(1), 306(2), and 306(3) (illustrated as female USB compliant receptacles), an Ethernet port 308, and a video port 310. Docking station circuit 312 shows a schematic view of docking station 302. In this example, the docking station includes three chipsets: a hub chipset 314, a video chipset 316, and an Ethernet chipset 318. The hub chipset 314 may be configured to function as a 4-port USB hub as indicated at 320. (While a 4-port hub example is shown here, there is nothing critical about this number and other implementations may relate to USB hubs with more or fewer ports).

The video chipset 316 may be configured to provide a USB 3.0 to video functionality as indicated at 322. The Ethernet chipset 318 may be configured to provide a USB 2.0 to Ethernet functionality as indicated at 324. Accordingly, hub chipset 314 is connected to upstream port 304 via an interface 326. Hub chipset 314 is connected to USB 3.0 port 306(1) via interface 328(1), to USB 3.0 port 306(2) via interface 328(2), and to USB 3.0 port 306(3) via interface 328(3). Further, the hub chipset is connected to both video chipset 316 and Ethernet chipset 318 via interface 328(4). Finally, the video chipset 316 is connected to video port 310 via interface 330. Similarly, Ethernet chipset 318 is connected to Ethernet port 308 via interface 332. Note that in this embodiment, the connections between hub chipset 314 and both video chipset 316 and Ethernet chipset 318 via interface 328(4) may be considered relatively "fixed." For example, short of a failure of one of the chipsets and subsequent replacement, the connections are not intended to be disturbed. One scenario that may be considered relatively fixed is where the chipsets are soldered on a printed circuit board (PCB).

Interface 328(4) may be configured consistent with the description above relative to scenario 212 of FIG. 2. In this implementation, recall that docking station 302 includes a four port USB hub 320. Yet, communication may be established with five downstream mechanisms (e.g., USB 3.0 ports 306(1)-306(3), video chipset 316 and Ethernet chipset 318). Thus, the present implementation makes better use of the resources offered by a four port hub than previous technologies.

While system 300 is explained in the context of a docking station, the present concepts may be implemented in any number of devices, such as hubs, repeaters, splitters, monitors, ASICs, computing devices, camera and storage devices, among others.

Figure 4:
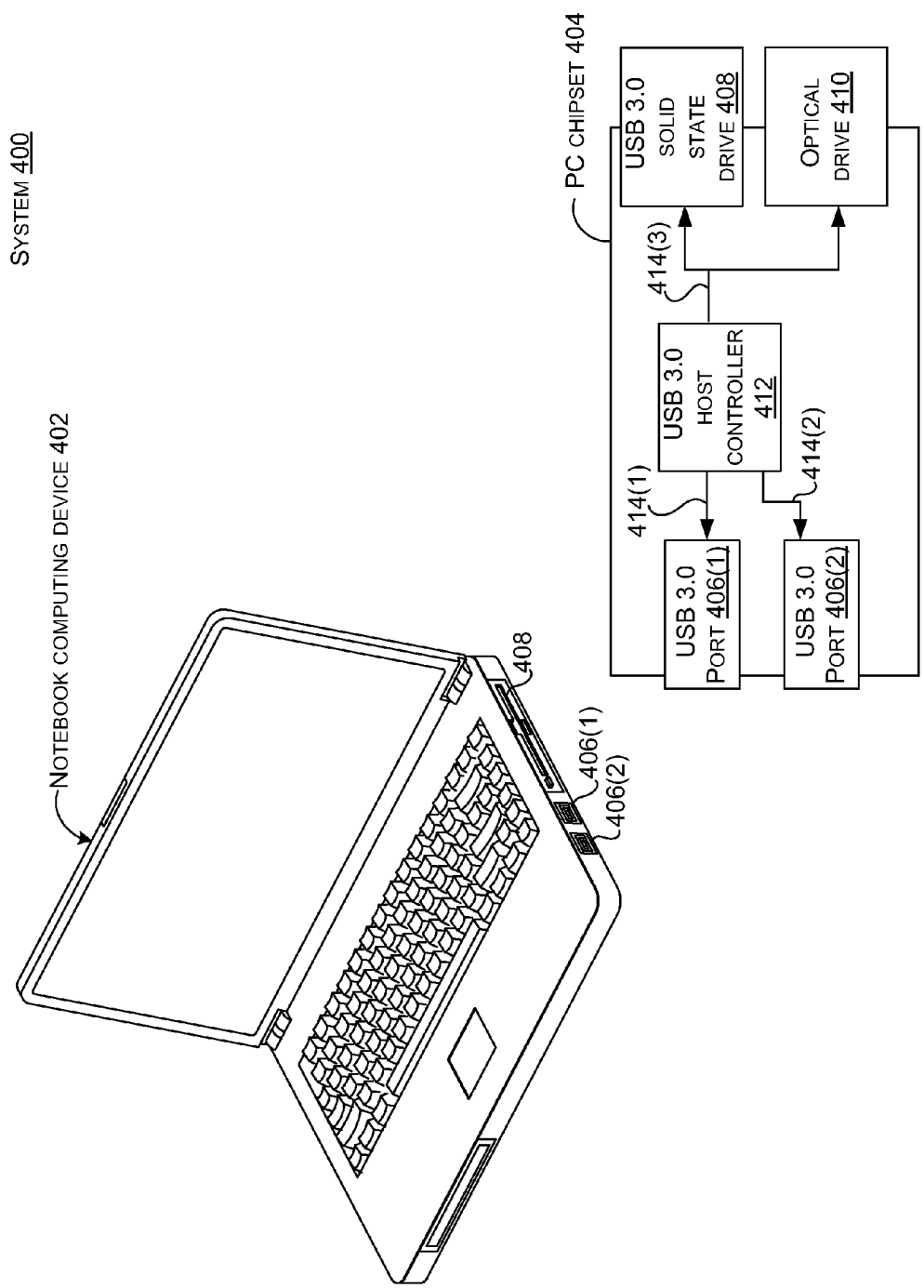

FIG. 4 shows yet another embodiment of a system 400 that may effectively utilize USB resources. System 400 includes a device in the form of a notebook computing device 402 that internally contains a PC chipset 404. The principles described relative to notebook computing device 402 may be utilized with other devices that may employ USB technologies. In this example, notebook computing device 402 includes two external USB 3.0 compliant downstream connections or ports 406(1) and 406(2) (illustrated as female USB receptacles), a USB 3.0 solid state drive 408, and a USB 2.0 optical drive 410. The PC chipset 404 includes a USB 3.0 host controller 412 and three USB 3.0 interfaces 414(1), 414(2), and 414(3).

The host controller 412 is coupled to USB 3.0 port 406(1) via USB 3.0 interface 414(1) and to USB 3.0 port 406(2) via USB 3.0 interface 414(2). The host controller 412 is coupled to both USB 3.0 solid state drive 408 and optical drive 410 via USB 3.0 interface 414(3). In this particular case, the interface 414(3) may allow SuperSpeed signals to be communicated between the USB 3.0 host controller 412 and the USB 3.0 solid state drive 408. The interface 414(3) may also allow Hi-Speed (and/or low-speed and/or full-speed signals) to be communicated between the host controller 412 and the optical drive 410. Thus, the present implementation may allow the USB 3.0 host controller 412 to communicate with four ports and/or devices utilizing only three interfaces. Accordingly, this implementation makes better use of the available resources than previous technologies.

Figure 5:
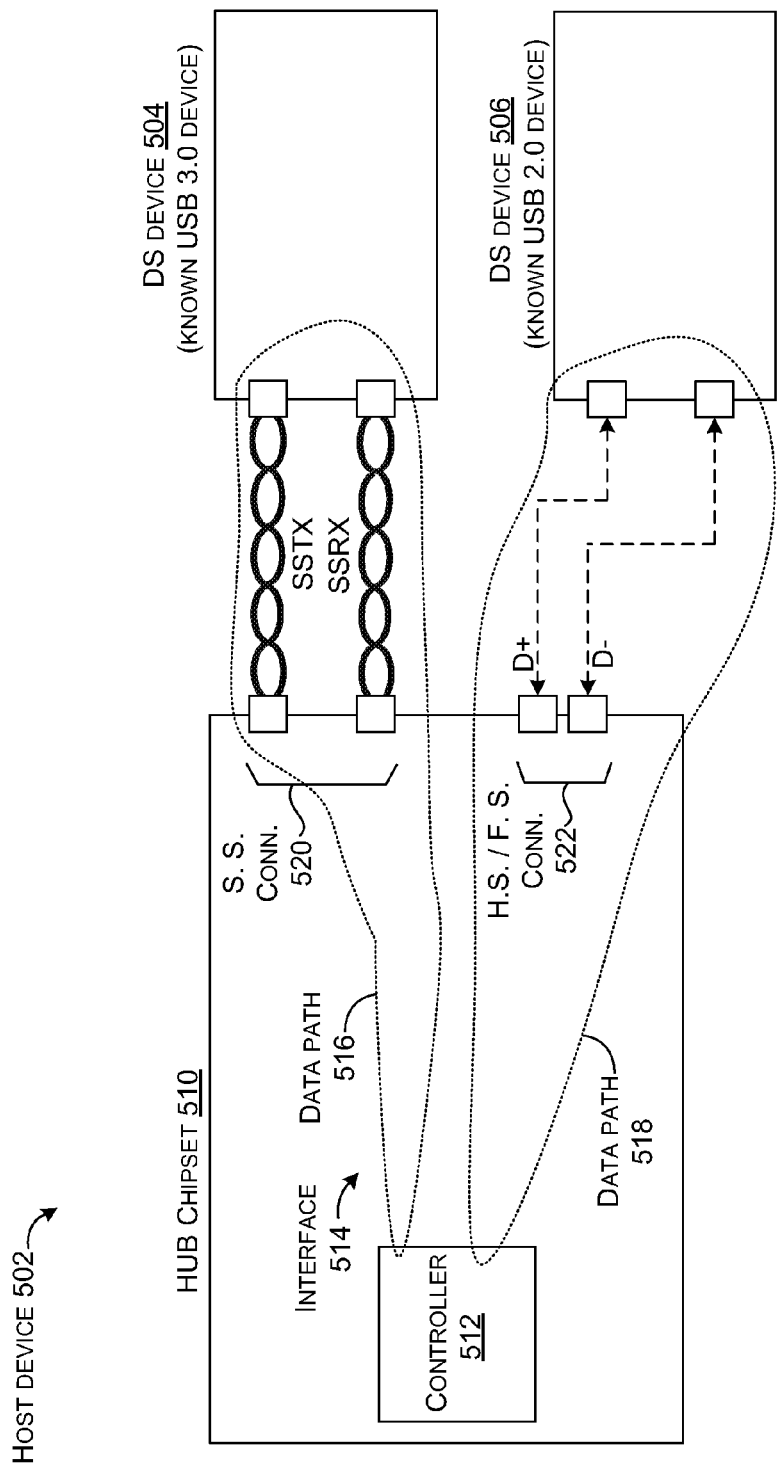

FIG. 5 shows yet another embodiment of a system 500 that may effectively utilize USB resources. System 500 includes a host or upstream device 502 and two downstream devices 504 and 506. In this example, downstream device 504 is a known USB 3.0 compliant device and downstream device 506 is a known USB 2.0 compliant device.

Host device 502 includes a host chipset 510 that includes a controller 512 and that defines an interface 514. (Host chipset 510 may also define other interfaces that are not shown here, but are shown for example in FIG. 3). The interface 514 may define a first data or signal path 516 and a second data or signal path 518. The first data path 516 may extend between host device 502 and downstream device 504 to allow communications between the two devices. Similarly, second data path 518 may extend between host device 502 and downstream device 506 to allow communications between the two devices.

First data path 510 may include a first set of conductors 520 while second data path 512 may include a second set of conductors 522. The first set of conductors 520 may be USB 3.0 compliant SSTX and SSTR lines. Similarly, the second set of conductors 522 may be USB 2.0 compliant D+ and D− lines.

Interface 514 may allow data communications between controller 512 and first and second downstream devices 504 and 506. Further, in this implementation, data paths 516 and 518 may allow simultaneous communications between downstream device 504 and the controller 512 and between downstream device 506 and the controller, respectively. For instance, downstream device 504 may send data to the controller over data path 516 while downstream device 506 sends data to the controller over data path 518. This configuration may prevent garbling of data that could occur by simultaneous communication over a shared data path.

Figure 6:
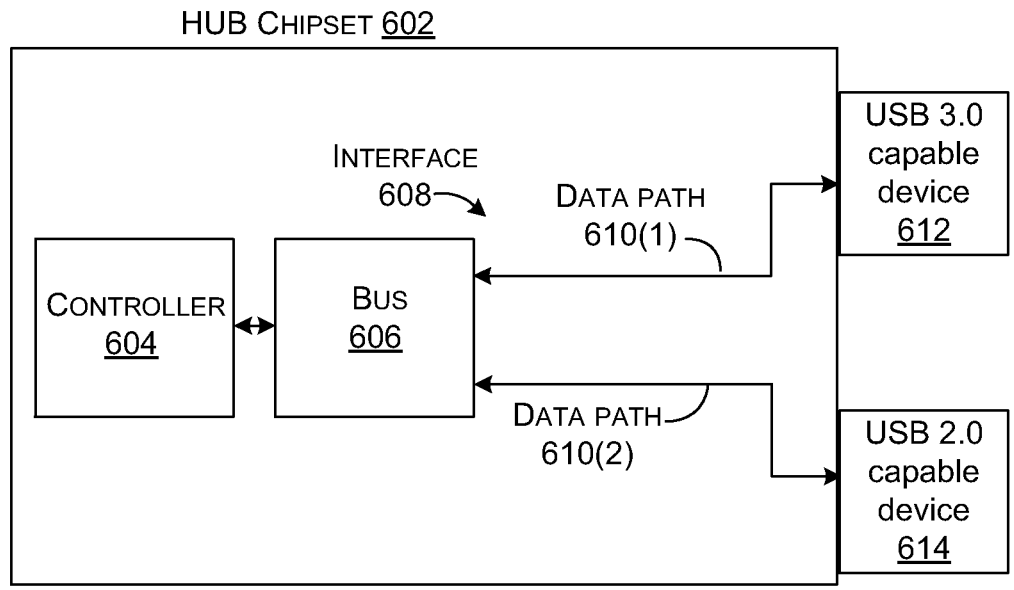
Figure 7:
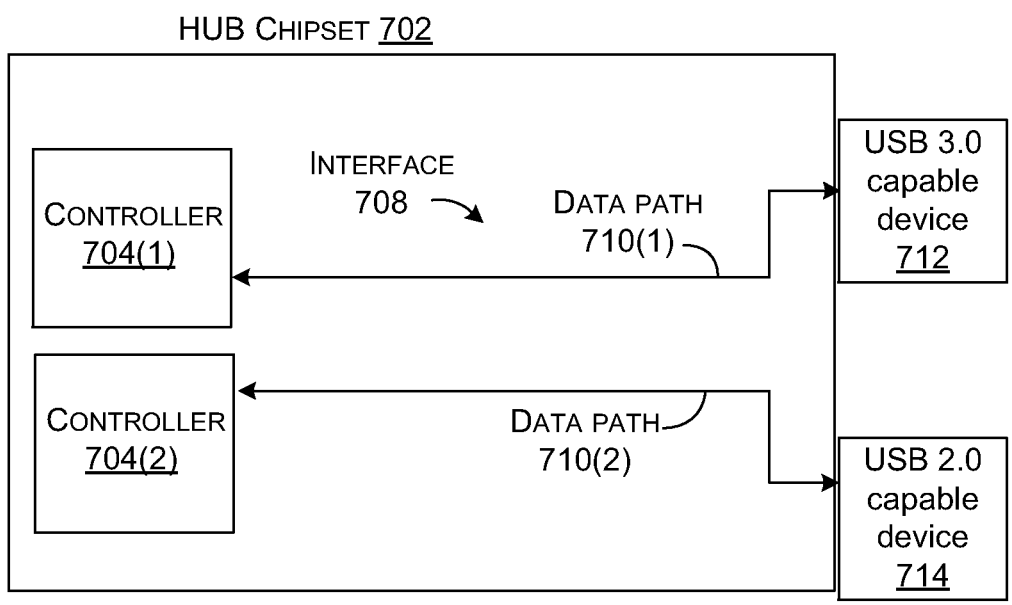

FIGS. 6 and 7 show two alternate configurations of embodiments for allowing communication between a host device and two downstream devices over a single interface.

FIG. 6 shows a hub chipset 602, according to one embodiment. The hub chipset includes a controller 604, a bus 606, and an interface 608. The interface forms two data paths 610(1) and 610(2). Data path 610(1) enables SuperSpeed signals to be communicated to bus 606 over interface 608 when the data path is coupled to a USB 3.0 capable device 612. Data path 610(2) enables standard-speed or high-speed signals to be communicated to bus 606 over interface 608 when the data path is coupled to a USB 2.0 capable device 614.

FIG. 7 shows another embodiment of a hub chipset in hub chipset 702. The hub chipset 702 includes two controllers 704(1) and 704(2) and an interface 708. The interface may include two data paths 710(1) and 710(2). Data path 710(1) enables SuperSpeed signals to be communicated over interface 708 when the data path is connected to a USB 3.0 capable device 712. Data path 710(2) enables standard-speed or high-speed signals to be communicated over interface 708 when the data path is connected to a USB 2.0 capable device 714.

The above described implementations allow a single USB 3.0 interface to be coupled to two different downstream devices and to provide satisfactory communications with both downstream devices via the single USB 3.0 interface.

To summarize, the present implementations offer a way to share a single USB 3.0 interface to connect two separate USB devices. Viewed from another perspective, the present techniques offer a way for available lines or conductors on a USB 3.0 host interface to connect a USB 3.0 device using the dedicated USB 3.0 conductors, and a USB 2.0 device using the dedicated USB 2.0 conductors. These techniques enable a designer to save an entire USB 3.0 port in a design where it is known one of the connected devices supports USB 3.0 (e.g., is USB 3.0 capable). Thus, these techniques allow a given design to provide extra ports with a given set of hardware than existing technologies.

Although techniques, methods, devices, systems, etc., pertaining to utilizing USB resources are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A device, comprising:
a downstream interface port including a first conductor configured to connect with a Universal Serial Bus (USB) SuperSpeed capable device and including a second conductor configured to connect with a USB Hi-Speed device,
wherein the downstream interface port is configured to transmit USB SuperSpeed signals to the USB SuperSpeed capable device via the first conductor and to transmit USB Hi-Speed signals to the USB Hi-Speed device via the second conductor at the same time.

2. The device of claim 1, further comprising a controller configured to communicate with the USB SuperSpeed capable device using a first data path through the downstream interface port, and communicate with the USB Hi-Speed device using a second data path through the downstream interface port.

3. The device of claim 2, wherein the first and second data paths are separate and distinct from one another.

4. The device of claim 1, further comprising:
a first controller configured to communicate with the USB SuperSpeed capable device using a first data path through the downstream interface port; and
a second controller communicate with the USB Hi-Speed device using a second data path through the downstream interface port.

5. The device of claim 1, wherein the downstream interface port is configured to overlap communication of USB SuperSpeed signals and USB Hi-Speed signals.

6. The device of claim 1, further comprising a host controller, a hub controller, or a system on chip that includes the host controller or the hub controller.

7. The device of claim 1, further comprising a USB controller configured to alternate between transmitting USB SuperSpeed signals to the USB SuperSpeed capable device and transmitting USB Hi-Speed signals to the USB Hi-Speed device.

8. A method comprising:
transmitting, by a downstream interface port, Universal Serial Bus (USB) SuperSpeed signals to a USB SuperSpeed capable device; and
transmitting, by the downstream interface port, USB Hi-Speed signals to a USB Hi-Speed device,
wherein the downstream interface port is configured to connect with both the USB SuperSpeed capable device and the USB Hi-Speed device during the transmission of the USB SuperSpeed signals or the USB Hi-Speed signals,
wherein the downstream interface port is configured to transmit the USB SuperSpeed signals and the USB Hi-Speed signals at the same time.

9. The method of claim 8, wherein the transmitting of the USB SuperSpeed signals to the USB SuperSpeed capable device overlaps with the transmitting of the USB Hi-Speed signals to the USB Hi-Speed device.

10. The method of claim 8, wherein the transmitting of the USB SuperSpeed signals to the USB SuperSpeed capable device alternates with the transmitting of the USB Hi-Speed signals to the USB Hi-Speed device.

11. The method of claim 8, wherein the USB SuperSpeed capable device is a first chipset and the USB Hi-Speed device is a second chipset.

12. A system, comprising:
a USB hub device comprising a downstream interface having a first set of USB SuperSpeed conductors configured to connect with a USB SuperSpeed capable chip set and a second set of USB Hi-Speed conductors configured to connect with a USB Hi-Speed chip set,
wherein the downstream interface is configured to transmit USB SuperSpeed signals using the first set of USB SuperSpeed conductors and USB Hi-Speed signals using the second set of USB Hi-Speed conductors at the same time.

13. The system of claim 12, wherein the downstream interface is configured to provide a first data path and a first buffer for the USB SuperSpeed capable chip set and a second data path and a second buffer for the USB Hi-Speed chip set.

14. The system of claim 13, wherein the USB SuperSpeed conductors are soldered to the USB SuperSpeed capable chip set and the second set of USB Hi-Speed conductors are soldered to the USB Hi-Speed chip set.

15. The system of claim 12, wherein the USB hub device comprises a controller, and wherein the first set of USB SuperSpeed conductors provide a first data path between the USB SuperSpeed compliant chip set and the controller and wherein the second set of USB Hi-Speed conductors provide a second data path between the USB Hi-Speed chip set and the controller.

16. The system of claim 15, wherein the first data path and the second data path allow overlapping communications from the USB SuperSpeed capable chip set to the controller and from the USB Hi-Speed chip set to the controller.

17. The system of claim 12, wherein the USB SuperSpeed capable chip set is a video chipset that includes a video port and wherein the USB Hi-Speed chip set is an Ethernet chipset that includes an Ethernet port.

18. The system of claim 12, wherein the USB hub device is configured to alternate between communicating with the USB SuperSpeed capable chip set using USB SuperSpeed signals and communicating with the USB Hi-Speed chip set using USB Hi-Speed signals.

19. A method, comprising:
communicating with a Universal Serial Bus (USB) SuperSpeed capable device via a downstream device connected to the USB SuperSpeed capable device; and
communicating with a USB Hi-Speed device via the downstream device connected to the USB Hi-Speed device, while the downstream device is connected to the USB SuperSpeed capable device,
wherein the downstream device is configured to communicate with the USB SuperSpeed capable device and the USB SuperSpeed capable device at the same time.

20. The method of claim 19, wherein communicating with the USB SuperSpeed capable device further comprises communicating USB SuperSpeed signals to the USB SuperSpeed capable device, and wherein communicating with the USB Hi-Speed device further comprises communicating USB Hi-Speed signals to the USB Hi-Speed device.

21. The method of claim 19, further comprising alternating between communicating with the USB SuperSpeed capable device and communicating with the USB Hi-Speed device.

22. The method of claim 19, wherein the communicating with the USB SuperSpeed capable device at least partially overlaps with the communicating with the USB Hi-Speed device.

* * * * *